(12) United States Patent
Ye et al.

(10) Patent No.: US 12,145,873 B1
(45) Date of Patent: Nov. 19, 2024

(54) PREPARATION METHOD FOR MODIFIED CATHODE OF MEC-AD SYSTEM AND APPLICATION OF SYSTEM WITH HIGH EFFICIENCY AND LOW ENERGY CONSUMPTION

(71) Applicant: Jiangsu Academy of Agricultural Sciences, Nanjing (CN)

(72) Inventors: Xiaomei Ye, Nanjing (CN); Yonglan Xi, Nanjing (CN); Yang Liu, Nanjing (CN); Chengcheng Wang, Nanjing (CN); Fei Zhu, Nanjing (CN); Xiangping Kong, Nanjing (CN); Jing Du, Nanjing (CN); Yingpeng Zhang, Nanjing (CN)

(73) Assignee: JIANGSU ACADEMY OF AGRICULTURAL SCIENCES, Nanjing (CN)

( * ) Notice: Subject to any disclaimer, the term of this patent is extended or adjusted under 35 U.S.C. 154(b) by 0 days.

(21) Appl. No.: 18/669,020

(22) Filed: May 20, 2024

(30) Foreign Application Priority Data

Nov. 21, 2023 (CN) .............................. 202311552068

(51) Int. Cl.
*C02F 3/00* (2023.01)
*C01B 32/05* (2017.01)
(Continued)

(52) U.S. Cl.
CPC .............. *C02F 3/005* (2013.01); *C01B 32/05* (2017.08); *C02F 3/28* (2013.01); *C07F 15/06* (2013.01);
(Continued)

(58) Field of Classification Search
CPC ........ C02F 3/005; C02F 3/28; C02F 2101/30; C02F 2103/20; C02F 2201/009;
(Continued)

(56) References Cited

U.S. PATENT DOCUMENTS

2014/0322518 A1* 10/2014 Addleman ........... B01D 53/228
427/244

FOREIGN PATENT DOCUMENTS

| CN | 109126893 A | * | 1/2019 | .......... B01J 31/1691 |
| CN | 114122332 A | * | 3/2022 | |

(Continued)

OTHER PUBLICATIONS

Machine-generated English translation of CN 109126893, generated on Jul. 2, 2024.*

(Continued)

*Primary Examiner* — Fred Prince
(74) *Attorney, Agent, or Firm* — MUNCY, GEISSLER, OLDS & LOWE, P.C.

(57) ABSTRACT

The present invention provides a preparation method for a modified cathode of an MEC-AD system and application of the system with high efficiency and low energy consumption. A NiCo-BDC hydrothermal carbon composite MOF material is designed and used for modifying a cathode, which can remove COD more rapidly compared with traditional AD. A wind energy and light energy complementary power generation device is used for energy supply of the MEC-AD system, and energy consumption is further reduced by setting an intermittent power supply mode. The intermittent power supply achieves higher energy recovery efficiency while obtaining higher performance, can effectively reduce energy consumption of the MEC-AD system, is conducive to more convenient configuration of a power generation and energy supply device using clean energy, and has a good application prospect in reducing COD in organic wastewater with low energy consumption and high efficiency.

10 Claims, 2 Drawing Sheets

(51) Int. Cl.
*C02F 1/46* (2023.01)
*C02F 3/28* (2023.01)
*C07F 15/06* (2006.01)
*C02F 1/461* (2023.01)
*C02F 101/30* (2006.01)
*C02F 103/20* (2006.01)

(52) U.S. Cl.
CPC ...... *C01P 2006/40* (2013.01); *C02F 1/46109* (2013.01); *C02F 2001/46133* (2013.01); *C02F 2101/30* (2013.01); *C02F 2103/20* (2013.01); *C02F 2201/009* (2013.01); *C02F 2201/46165* (2013.01)

(58) Field of Classification Search
CPC ........ C02F 1/46109; C02F 2001/46133; C02F 2201/46165; C01B 32/05; C07F 15/06; C01P 2006/40
USPC .... 210/614, 748.01, 908; 205/150, 155, 320
See application file for complete search history.

(56) References Cited

FOREIGN PATENT DOCUMENTS

| CN | 114984934 A | * | 9/2022 | |
|---|---|---|---|---|
| CN | 115478364 A | * | 12/2022 | |
| CN | 116889880 A | * | 10/2023 | |
| CN | 117142584 A | * | 12/2023 | .......... C02F 1/46109 |

OTHER PUBLICATIONS

Machine-generated English translation of CN 114122332, generated on Jul. 2, 2024.*
Machine-generated English translation of CN 115478364, generated on Jul. 2, 2024.*
Machine-generated English translation of CN 114984934, generated on Jul. 2, 2024.*
Machine-generated English translation of CN 116889880, generated on Jul. 2, 2024.*
Machine-generated English translation of CN 117142584, generated on Jul. 2, 2024.*
Ayyagari et al., Metal organic frameworks modification of carbon fiber composite interface (2021), Composites Part B 224 109197, pp. 1-14.*

* cited by examiner

PREPARATION METHOD FOR MODIFIED CATHODE OF MEC-AD SYSTEM AND APPLICATION OF SYSTEM WITH HIGH EFFICIENCY AND LOW ENERGY CONSUMPTION

FIELD OF TECHNOLOGY

The present invention belongs to the technical field of organic wastewater treatment, and particularly relates to a preparation method for a modified cathode of an MEC-AD system and application of the system with high efficiency and low energy consumption.

BACKGROUND

With continuous increase of scale and intensification degrees of livestock and poultry breeding in China, breeding efficiency of live pigs are continuously improved, but a manure treatment problem caused by large-scale breeding leads to increasingly serious environmental pollution, which has become an important factor restricting further development of the livestock and poultry breeding industry. The livestock and poultry industry has pollution mainly resulted from excrement of livestock and poultry, in which generated breeding wastewater has become a main source of water pollution in China. According to data of Bulletin of the Second National Census of Pollution Sources, emissions of chemical oxygen demand, ammonia nitrogen, total nitrogen and total phosphorus in water pollutants of large-scale livestock and poultry breeding farms in China in 2017 are 6.0483 million tons, 7,5000 tons, 370,000 tons and 80,400 tons, accounting for 56.7%, 34.7%, 26.2% and 38.7% of emissions of water pollutants from agricultural sources, respectively.

AD has advantages in removing organic matter in chemical industry wastewater, pharmaceutical industry wastewater, textile industry wastewater, electronic industry wastewater, food processing industry wastewater, farmland irrigation wastewater, breeding wastewater, kitchen wastewater, bathroom and laundry room wastewater, toilet wastewater, medical treatment wastewater, sludge wastewater of sewage treatment plants and other organic wastewater. However, nitrogen-containing organic compounds, such as proteins, amino acids or urea, in the wastewater are not further degraded after being reduced to ammonia under anaerobic conditions. The stability of an AD process is affected by a temperature, a pH, an ammonia nitrogen concentration, a volatile fatty acid concentration, an organic load and other factors. MEC, as a microbial electrochemical system, has been considered as a promising device to improve AD efficiency of waste. However, due to limitations of low performance and high costs of electrodes as well as a too simple coupling method, large-scale application of an MEC coupling reactor is in slow progress.

SUMMARY

The purpose of the present invention is to provide a preparation method for a modified cathode of an MEC-AD system and application of the system with high efficiency and low energy consumption. Compared with traditional AD, an MEC-AD organic wastewater treatment system using a hydrothermal carbon composite MOF modified stainless steel mesh cathode and a wind power-solar power hybrid power supply device can remove COD more rapidly and has a good application prospect in reducing COD in organic wastewater with low energy consumption and high efficiency.

In order to achieve the above purpose, the present invention adopts the following technical solutions.

A preparation method for a hydrothermal carbon composite MOF modified stainless steel mesh cathode includes:
(1) evenly mixing deionized water, glucose and acrylic acid, carrying out a hydrothermal reaction at 170-200° C. for 8-24 h, and performing natural cooling, washing and drying;
(2) dissolving terephthalic acid, cobalt nitrate hexahydrate and nickel nitrate hexahydrate in dimethylformamide, then adding acrylic acid modified hydrothermal carbon synthesized in step (1), adding a sodium hydroxide solution dropwise, performing ultrasonic stirring continuously at 100-150° C. for 12-24 h, and washing and drying a resulting product; and
(3) subjecting a hydrothermal carbon composite MOF material prepared in step (2) to high temperature carbonization, preparing an electrode slurry by using the carbonized material, evenly coating the electrode slurry on a treated stainless steel mesh after even stirring, performing drying, and placing a dried electrode in a Muffle furnace for calcination.

Preferably, in step (1), a mixing ratio of the deionized water, the glucose and the acrylic acid is (25-50) mL:(3-6) g:(3-6) g.

Preferably, in step (2), a reaction ratio of the terephthalic acid, the cobalt nitrate hexahydrate, the nickel nitrate hexahydrate and the dimethylformamide is (0.73-0.83) g:(0.6-0.70) g:(0.66-0.76) g:(40-50) mL; and/or a reaction ratio of the acrylic acid modified hydrothermal carbon and the sodium hydroxide solution is (0.2-0.3) g:(2-3) mL; and/or a molar concentration of the sodium hydroxide solution is (0.3-0.6) M.

Preferably, in step (3), the prepared hydrothermal carbon composite MOF material is subjected to the high temperature carbonization at 750-850° C. in an inert gas atmosphere, and a heating rate is 4-6° C./min; and/or the electrode slurry is prepared by using the carbonized material, carbon black, a 60 wt % polytetrafluoroethylene suspension, ethanol and water, and a mixing ratio of the carbonized material, the carbon black, the 60 wt % polytetrafluoroethylene suspension, the ethanol and the water is (0.25-0.35) g:(0.08-0.12) g:(90-130) μL:(0.5-2) mL:(0.5-2) mL; and/or the dried electrode is placed in the Muffle furnace for the calcination at 330-350° C. for 20-40 min.

Preferably, in step (3), the stainless steel mesh is subjected to ultrasonic treatment with acetone, 1-3 M HCl, ethanol and water for 10-20 min, respectively.

More preferably, the stainless steel mesh have specifications of 150-250 mesh and (6-12) cm×(3-5) cm.

The present invention further provides a hydrothermal carbon composite MOF modified stainless steel mesh cathode, which is prepared by the preparation method.

The present invention further provides an MEC-AD system based on a modified cathode, including the hydrothermal carbon composite MOF modified stainless steel mesh cathode.

Preferably, the MEC-AD system further includes a wind power-solar power hybrid power supply device.

More preferably, the wind power-solar power hybrid power supply device is constructed by the following method: adding a battery and a controller to a solar panel and a wind driven generator to construct a complete power supply system, setting a direct-current voltage reduction and stabilization module at an output end of the power supply system, and maintaining an output voltage at 0.6-1.2 V.

The present invention further provides application of the MEC-AD system in treatment of organic wastewater. The application includes: connecting electrodes to an external circuit through metal wires, connecting the electrodes through wires, connecting a resistor in series, monitoring voltages at two ends of the resistor to calculate a current flowing in the circuit, adding organic wastewater and an inoculum, and placing a reactor in a water bath for operation.

Preferably, a wide-mouth bottle is used as the reactor, and the wide-mouth bottle has an effective working volume of 0.5-0.85 L; and/or carbon felt has a size of (60-80)×(30-50) mm and a thickness of 3-6 mm; and/or the hydrothermal carbon composite MOF modified stainless steel mesh cathode has a size of (60-80)×(30-50) mm; and/or the metal wires have a diameter of 1-2 mm; and/or a 10-20Ω resistor is connected in series; and/or the water bath has a temperature of 35-55° C.

Compared with the prior art, the present invention has the following advantages.

Low-cost CoNi-BDC with a catalytic hydrogen evolution function prepared by the method is used as an MOF material, and the material has better electrocatalytic hydrogen evolution performance and a lower cost. Meanwhile, the low-cost hydrothermal carbon composite MOF modified cathode is prepared by adding the hydrothermal carbon with good biocompatibility and rich oxygen-containing functional groups as a composite material. In terms of a power supply device, a wind energy and light energy complementary power generation device is used as an external power supply device of an MEC-AD reactor in the present invention, and energy consumption is further reduced by setting an intermittent power supply mode. The intermittent power supply achieves higher energy recovery efficiency while obtaining higher performance, can effectively reduce energy consumption of the MEC-AD system, is conducive to more convenient configuration of a power generation and energy supply device using clean energy, has good effects of reducing energy consumption and not affecting overall performance, and has a good application prospect in reducing COD in chemical industry wastewater, pharmaceutical industry wastewater, textile industry wastewater, electronic industry wastewater, food processing industry wastewater, farmland irrigation wastewater, breeding wastewater, kitchen wastewater, bathroom and laundry room wastewater, toilet wastewater, medical treatment wastewater, sludge wastewater of sewage treatment plants and other organic wastewater with low energy consumption and high efficiency.

DESCRIPTION OF THE EMBODIMENTS

In order to describe the present invention more clearly, the present invention is further described in detail below in combination with examples and accompanying drawings. For persons skilled in the art, it is to be understood that contents described in detail below are illustrative rather than restrictive and are not intended to limit the scope of protection of the present invention.

Example 1

(1) Synthesis of hydrothermal carbon (HC): 80 mL of deionized water, 10 g of glucose and 10 g of acrylic acid were evenly mixed and added to 200 mL of a stainless steel reactor with a polytetrafluoroethylene lining, and a hydrothermal reaction was carried out in an oven at 190° C. for 16 h. After natural cooling, washing was performed with ethanol and deionized water, respectively, and drying was performed overnight at 80° C.

Figure 1:
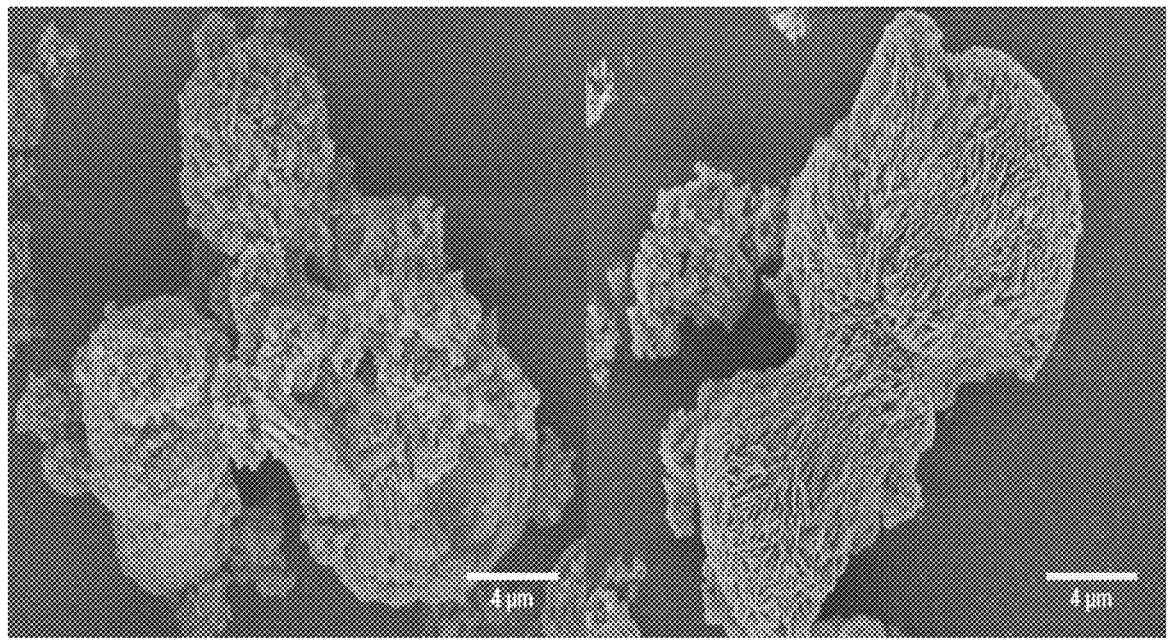
FIG. 1 shows scanning electron microscope images of MOF synthesized in the present invention.

(2) Synthesis of a hydrothermal carbon composite MOF material (NiCo-BDC@HC): 0.83 g of terephthalic acid, 0.70 g of cobalt nitrate hexahydrate and 0.76 g of nickel nitrate hexahydrate were ultrasonically dissolved in 50 mL of dimethylformamide, then 0.5 g of acrylic acid modified hydrothermal carbon was added, 5 mL of a 0.4 M sodium hydroxide solution was added dropwise, and ultrasonic stirring was performed continuously for 10 min. Then, an evenly mixed solution was transferred to a 200 mL stainless steel reactor and kept in an oven at 120° C. for 12 h. A resulting product was washed twice and subjected to vacuum drying at 60° C. Scanning electron microscope images are shown in FIG. 1. It is found that MOFs with different morphologies grow on a surface of the hydrothermal carbon, and the morphologies of the MOFs have a triangular sheet structure (FIG. 1, left) and an irregularly round sheet structure (FIG. 1, right).

(3) Preparation of a stainless steel mesh surface modified electrode: The prepared hydrothermal carbon composite MOF material was subjected to high temperature carbonization at 800° C. in an inert gas atmosphere, and a heating rate was 5° C./min. An electrode slurry was prepared by using 0.32 g of the carbonized material, 0.08 g of carbon black, 120 μL of a polytetrafluoroethylene suspension (60 wt %), 1 mL of ethanol and 0.5 mL of water. A 200-mesh stainless steel mesh (8 cm×4 cm) was selected as an adhesion surface of an electrode material. First, the stainless steel mesh was subjected to ultrasonic treatment with acetone, 2 M HCl, ethanol and water for 15 min, respectively and dried. Then, an evenly stirred electrode slurry was evenly coated on the treated stainless steel mesh and dried at 70° C. Finally, a dried electrode was placed in a Muffle furnace and subjected to calcination at 340° C. for 30 min.

Figure 2:
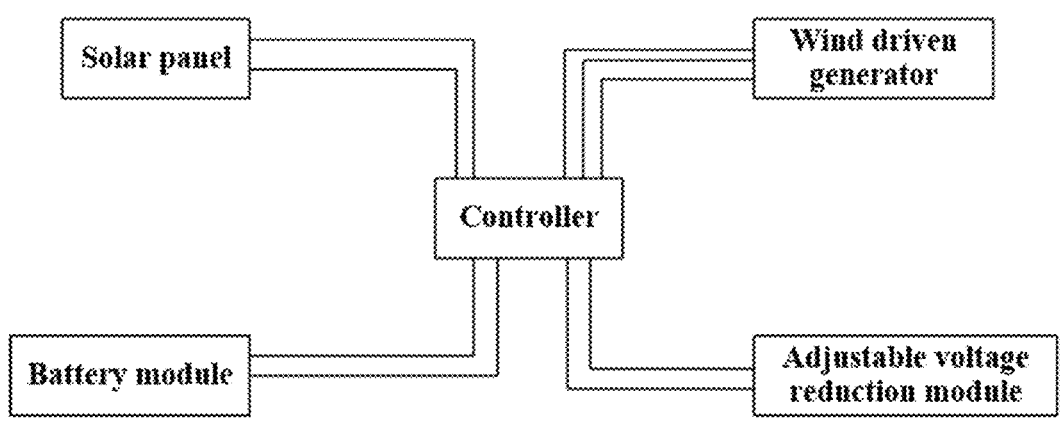
FIG. 2 shows a wind energy and light energy complementary power generation device of the present invention.

(4) Construction of a wind power-solar power hybrid power supply device: As shown in FIG. 2, a complete power supply system was constructed by adding a battery and a controller to a solar panel and a wind driven generator. A direct-current voltage reduction and stabilization module was set at an output end of the power supply system, and an output voltage was maintained at 0.6-1.2 V.

Example 2

(1) Synthesis of hydrothermal carbon (HC): 50 mL of deionized water, 6 g of glucose and 6 g of acrylic acid were evenly mixed and added to 200 mL of a stainless steel reactor with a polytetrafluoroethylene lining, and a hydrothermal reaction was carried out in an oven at 170° C. for 24 h. After natural cooling, washing was performed with ethanol and deionized water, respectively, and drying was performed overnight at 100° C.

(2) Synthesis of a hydrothermal carbon composite MOF material (NiCo-BDC@HC): 0.73 g of terephthalic acid, 0.6 g of cobalt nitrate hexahydrate and 0.66 g of nickel nitrate hexahydrate were ultrasonically dissolved in 40 mL of dimethylformamide, then 0.4 g of acrylic acid modified hydrothermal carbon was added, 4 mL of a 0.6 M sodium hydroxide solution was added dropwise, and ultrasonic stirring was performed continuously for 15 min. Then, an evenly mixed solution was transferred to a 200 mL stainless steel reactor and kept in an oven at 150° C. for 16 h. A resulting product was washed twice and subjected to vacuum drying at 70° C.

(3) Preparation of a stainless steel mesh surface modified electrode: The prepared hydrothermal carbon composite MOF material was subjected to high temperature carbonization at 750° C. in an inert gas atmosphere, and a heating rate was 4° C./min. An electrode slurry was prepared by using 0.25 g of the carbonized material, 0.10 g of carbon black, 90 μL of a polytetrafluoroethylene suspension (60 wt %), 0.5 mL of ethanol and 1.0 ml of water. A 250-mesh stainless steel mesh (6 cm×3 cm) was selected as an adhesion surface of an electrode material. First, the stainless steel mesh was subjected to ultrasonic treatment with acetone, 1 M HCl, ethanol and water for 10 min, respectively and dried. Then, an evenly stirred electrode slurry was evenly coated on the treated stainless steel mesh and dried at 55° C. Finally, a dried electrode was placed in a Muffle furnace and subjected to calcination at 330° C. for 40 min.

(4) Construction of a wind power-solar power hybrid power supply device: A complete power supply system was constructed by adding a battery and a controller to a solar panel and a wind driven generator. A direct-current voltage reduction and stabilization module was set at an output end of the power supply system, and an output voltage was maintained at 0.6-1.2 V.

Example 3

(1) Synthesis of hydrothermal carbon (HC): 100 mL of deionized water, 12 g of glucose and 12 g of acrylic acid were evenly mixed and added to 200 mL of a stainless steel reactor with a polytetrafluoroethylene lining, and a hydrothermal reaction was carried out in an oven at 200° C. for 8 h. After natural cooling, washing was performed with ethanol and deionized water, respectively, and drying was performed overnight at 115° C.

(2) Synthesis of a hydrothermal carbon composite MOF material (NiCo-BDC@HC): 0.8 g of terephthalic acid, 0.65 g of cobalt nitrate hexahydrate and 0.70 g of nickel nitrate hexahydrate were ultrasonically dissolved in 45 mL of dimethylformamide, then 0.6 g of acrylic acid modified hydrothermal carbon was added, 6 mL of a 0.3 M sodium hydroxide solution was added dropwise, and ultrasonic stirring was performed continuously for 20 min. Then, an evenly mixed solution was transferred to a 200 mL stainless steel reactor and kept in an oven at 100° C. for 24 h. A resulting product was washed twice and subjected to vacuum drying at 80° C.

(3) Preparation of a stainless steel mesh surface modified electrode: The prepared hydrothermal carbon composite MOF material was subjected to high temperature carbonization at 850° C. in an inert gas atmosphere, and a heating rate was 6° C./min. An electrode slurry was prepared by using 0.35 g of the carbonized material, 0.12 g of carbon black, 130 μL of a polytetrafluoroethylene suspension (60 wt %), 2 mL of ethanol and 2 mL of water. A 150-mesh stainless steel mesh (12 cm×5 cm) was selected as an adhesion surface of an electrode material. First, the stainless steel mesh was subjected to ultrasonic treatment with acetone, 3 M HCl, ethanol and water for 20 min, respectively and dried. Then, an evenly stirred electrode slurry was evenly coated on the treated stainless steel mesh and dried at 80° C. Finally, a dried electrode was placed in a Muffle furnace and subjected to calcination at 350° C. for 20 min.

(4) Construction of a wind power-solar power hybrid power supply device: A complete power supply system was constructed by adding a battery and a controller to a solar panel and a wind driven generator. A direct-current voltage reduction and stabilization module was set at an output end of the power supply system, and an output voltage was maintained at 0.6-1.2 V.

Application Example

Figure 3:
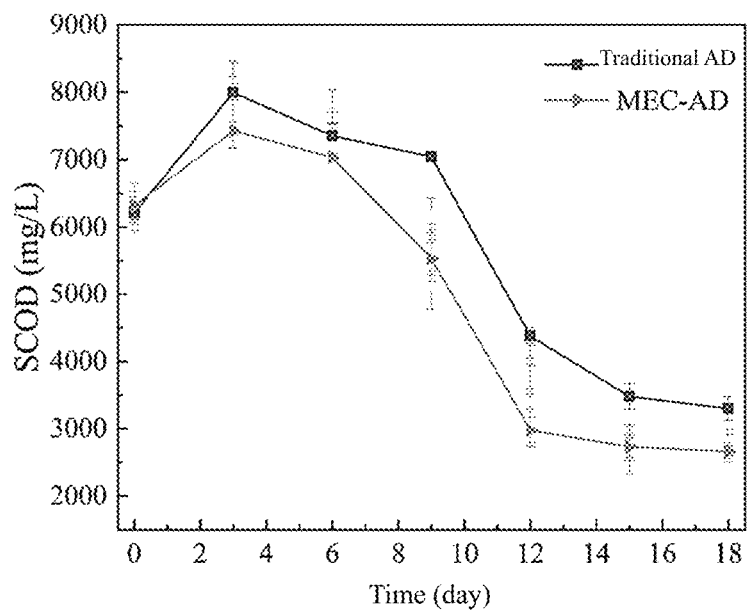
FIG. 3 shows SCOD change curves of traditional AD and an MEC-AD system of the present invention.

With an MEC-AD system prepared in Example 1 as an example, a 1 L wide-mouth bottle was used as a reactor, where the wide-mouth bottle had a working volume of 0.75 L; carbon felt (carbon cloth/carbon fibers/a metal electrode and the like can also be used) with a size of 75×40 mm and a thickness of 5 mm was used as an anode; a hydrothermal carbon composite MOF electrode with a size of 75×40 mm was used as a cathode; metal wires with a diameter of 2 mm were used; a 15Ω resistor was connected in series; 500 mL of pig farm wastewater and 250 mL of an inoculum were added to the reactor, and the reactor was purged with nitrogen for 10 min to remove oxygen before sealing; and a water bath with a temperature of 50° C. was used. As shown in FIG. 3, the MEC-AD system has a highest SCOD degradation rate of 58.01%, which is higher than 46.91% of traditional AD (a CK group) and shows faster removal of SOD.

Results in Examples 2 and 3 are generally consistent with those in Example 1 and are not repeatedly described herein.

Obviously, the above examples of the present invention are only exemplified for describing the present invention more clearly and are not intended to limit embodiments of the present invention. For persons of ordinary skill in the art, other changes or modifications in different forms can also be made based on the above description. The embodiments are not completely provided herein, and any obvious changes or modifications obtained from the technical solutions of the present invention still fall within the scope of protection of the present invention.

What is claimed is:

1. A preparation method for a hydrothermal carbon composite MOF modified stainless steel mesh cathode, comprising:
   (1) evenly mixing deionized water, glucose and acrylic acid, carrying out a hydrothermal reaction at 170-200° C. for 8-24 h, and performing natural cooling, washing and drying;
   (2) dissolving terephthalic acid, cobalt nitrate hexahydrate and nickel nitrate hexahydrate in dimethylformamide, then adding acrylic acid modified hydrothermal carbon synthesized in step (1), adding a sodium hydroxide solution dropwise, performing ultrasonic stirring continuously at 100-150° C. for 12-24 h, and washing and drying a resulting product; and
   (3) subjecting a hydrothermal carbon composite MOF material prepared in step (2) to high temperature carbonization, preparing an electrode slurry by using the carbonized material, evenly coating the electrode slurry on a treated stainless steel mesh after even stirring, performing drying, and placing a dried electrode in a Muffle furnace for calcination.

2. The preparation method according to claim 1, wherein in step (1), a mixing ratio of the deionized water, the glucose and the acrylic acid is (25-50) mL:(3-6) g:(3-6) g.

3. The preparation method according to claim 1, wherein in step (2), a reaction ratio of the terephthalic acid, the cobalt nitrate hexahydrate, the nickel nitrate hexahydrate and the dimethylformamide is (0.73-0.83) g:(0.6-0.70) g:(0.66-0.76) g:(40-50) mL; and/or a reaction ratio of the acrylic acid modified hydrothermal carbon and the sodium hydroxide solution is (0.2-0.3) g:(2-3) mL; and/or a molar concentration of the sodium hydroxide solution is (0.3-0.6) M.

4. The preparation method according to claim 1, wherein in step (3), the prepared hydrothermal carbon composite MOF material is subjected to the high temperature carbonization at 750-850° C. in an inert gas atmosphere, and a heating rate is 4-6° C./min; and/or the electrode slurry is prepared by using the carbonized material, carbon black, a 60 wt % polytetrafluoroethylene suspension, ethanol and water, and a mixing ratio of the carbonized material, the carbon black, the 60 wt % polytetrafluoroethylene suspension, the ethanol and the water is (0.25-0.35) g:(0.08-0.12) g:(90-130) μL:(0.5-2) mL:(0.5-2) mL; and/or the dried electrode is placed in the Muffle furnace for the calcination at 330-350° C. for 20-40 min.

5. A hydrothermal carbon composite MOF modified stainless steel mesh cathode, prepared by the preparation method according to claim 1.

6. An MEC-AD system based on a modified cathode, comprising the hydrothermal carbon composite MOF modified stainless steel mesh cathode according to claim 5.

7. The MEC-AD system according to claim 6, further comprising a wind power-solar power hybrid power supply device.

8. The MEC-AD system according to claim 7, wherein the wind power-solar power hybrid power supply device is constructed by the following method: adding a battery and a controller to a solar panel and a wind driven generator to construct a complete power supply system, setting a direct-current voltage reduction and stabilization module at an output end of the power supply system, and maintaining an output voltage at 0.6-1.2 V.

9. Application of the MEC-AD system according to claim 6 in treatment of organic wastewater, comprising: connecting electrodes to an external circuit through metal wires, connecting the electrodes through wires, connecting a resistor in series, monitoring voltages at two ends of the resistor to calculate a current flowing in the circuit, adding organic wastewater and an inoculum, and placing a reactor in a water bath for operation.

10. The application according to claim 9, wherein a wide-mouth bottle is used as the reactor, and the wide-mouth bottle has an effective working volume of 0.5-0.85 L; and/or carbon felt has a size of (60-80)×(30-50) mm and a thickness of 3-6 mm; and/or the hydrothermal carbon composite MOF modified stainless steel mesh cathode has a size of (60-80)×(30-50) mm; and/or the metal wires have a diameter of 1-2 mm; and/or a 10-20Ω resistor is connected in series; and/or the water bath has a temperature of 35-55° C.

* * * * *